Dec. 11, 1956 M. R. RICHMOND ET AL 2,774,035
MAGNETOSTRICTIVE FREQUENCY ANALYSERS
Filed Jan. 7, 1954. 2 Sheets-Sheet 1

INVENTORS
MARTIN R. RICHMOND
DANIEL BLITZ
BY
ATTORNEY

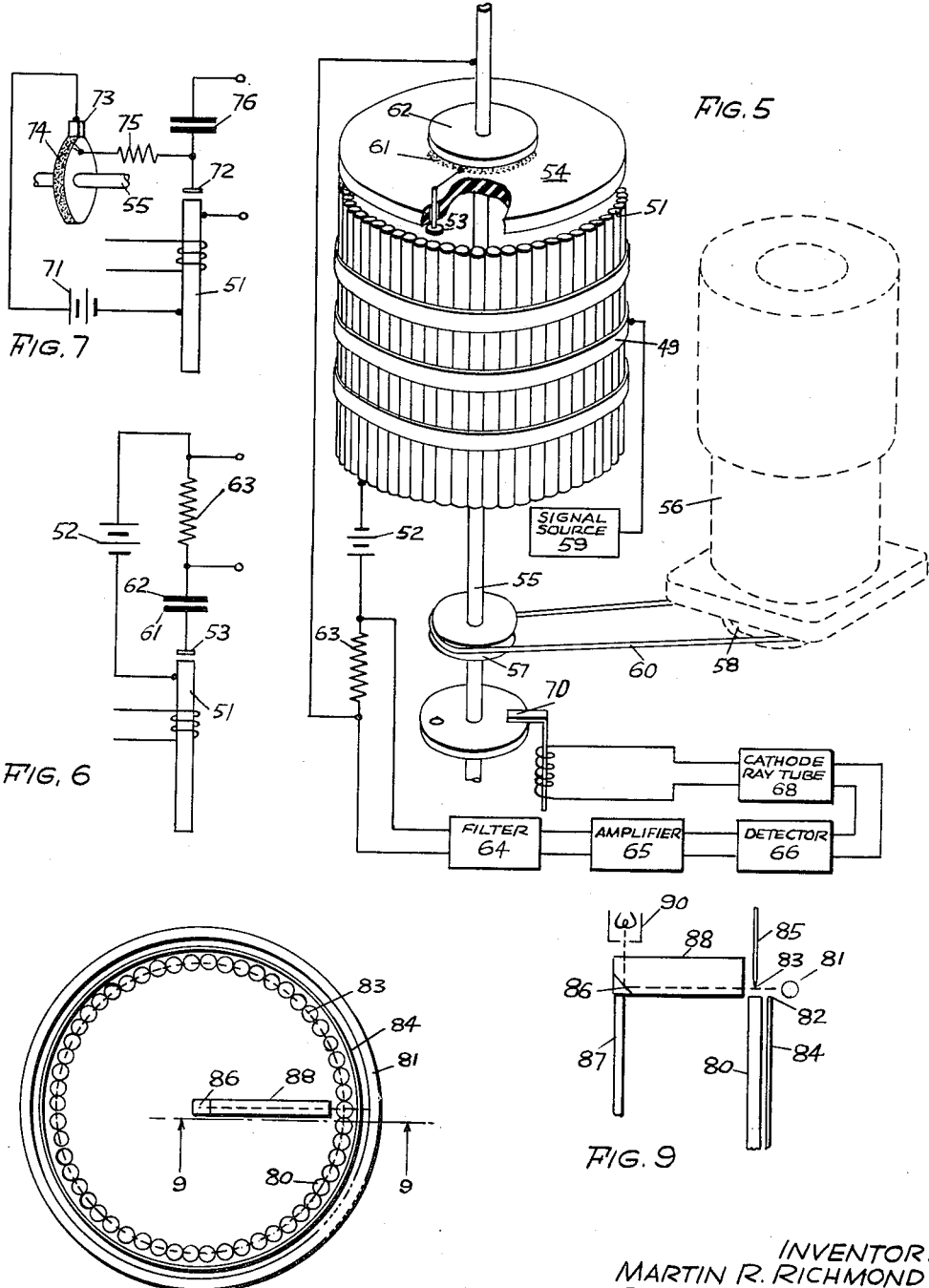

United States Patent Office 2,774,035
Patented Dec. 11, 1956

2,774,035

MAGNETOSTRICTIVE FREQUENCY ANALYSERS

Martin R. Richmond, Nashua, N. H., and Daniel Blitz, Boston, Mass., assignors to Raytheon Manufacturing Company, Newton, Mass., a corporation of Delaware Application January 7, 1954, Serial No. 402,676

18 Claims. (Cl. 324—77)

This invention relates to magnetostrictive frequency analysers, and more particularly to systems of this type in which individual magnetostrictive elements, each resonant at one of the frequencies in the band of interest, are driven by a common source and scanned by a pickup device to indicate the frequencies within the band present in the applied signal.

Where rapid scanning of a band of frequencies is desired, together with the ability to discriminate between two frequencies within the band that are very close together, it becomes difficult to apply the signal to each filter unit for a sufficient time to obtain a signal response. In an analyser of the invention, the signal is applied to all the filter elements simultaneously and the output of each filter element is sampled successively. In order to distinguish closely spaced frequencies, it is necessary to have filter circuits with a high Q. Such circuits are difficult and bulky to construct at low frequencies that are of interest in either an audio frequency analyser or in the indicator of a CW or FM radar system. This difficulty is overcome in the present invention by the use of resonant magnetostrictive structures. The mechanical displacement of the magnetostrictive elements is sensed in one of several ways. The displacement causes compressional waves at sonic and ultrasonic frequencies in the air. These waves may be picked up by a scanning microphone. A light source and photoelectric pickup can also be arranged so that the displacement at the end of each of the vibrating elements obstructs a varying amount of the beam, and, as the photoelectric element is swept past the ends of the vibrating elements, an indication of the relative amplitudes of the various frequencies present in the signal may be obtained. A small capacity can be formed by successively presenting a small disc to the end of each vibrating element. Variations in a voltage applied across the capacitor is then filtered and rectified to give an indication of the frequency distribution within the signal. With any of these methods, it is possible to obtain a rapidly scanning analyser of relatively low frequencies with considerable resolution between frequencies.

Other objects and further advantages of this invention will be apparent as the description thereof progresses, reference being had to the accompanying drawings, wherein:

Fig. 5 is a diagrammatic view of a second embodiment of the invention;

Fig. 6 is a schematic diagram of the electrical circuit of the analyser shown in Fig. 5;

Fig. 7 is a schematic diagram of a modification of the electrical circuit shown in Fig. 6;

Fig. 8 is a diagrammatic plan view of a third embodiment of the invention; and

Fig. 9 is a diagrammatic sectional view of the embodiment shown in Fig. 8 taken along the line 9—9 in Fig. 8.

Figure 1:
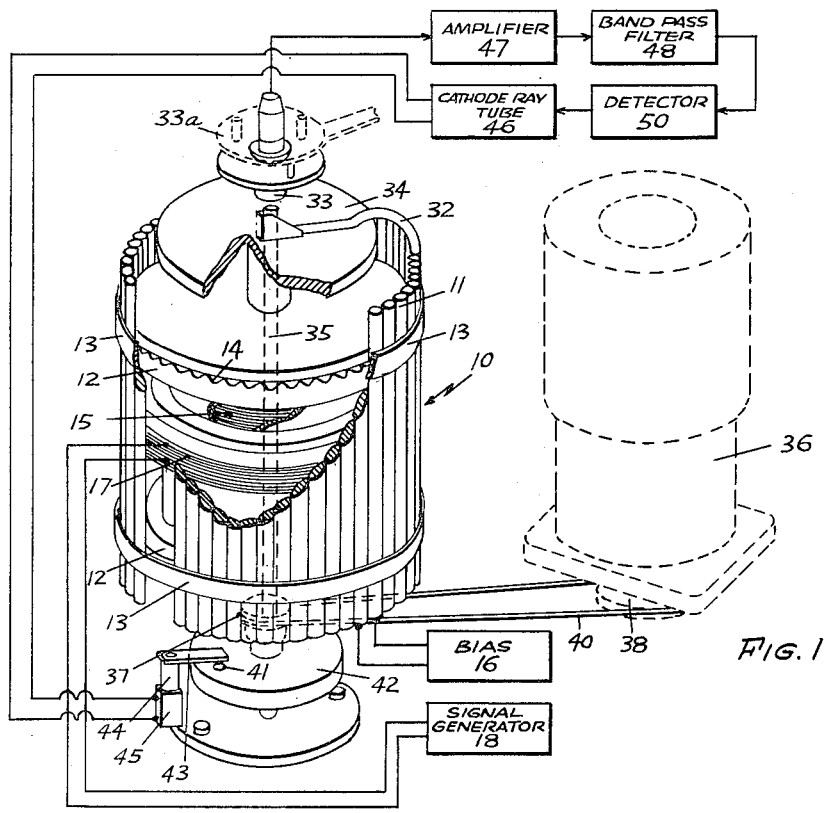
Fig. 1 is a diagrammatic view of a preferred embodiment of the invention.
Figure 3:
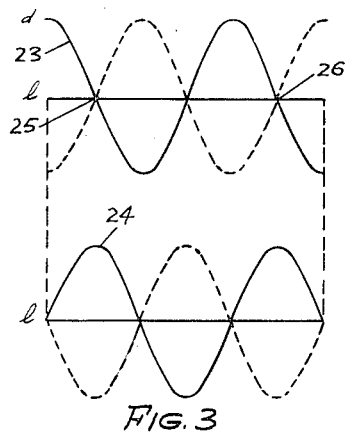
Fig. 3 is a diagram of the mode of vibration of a magnetostrictive element.
Figure 4:
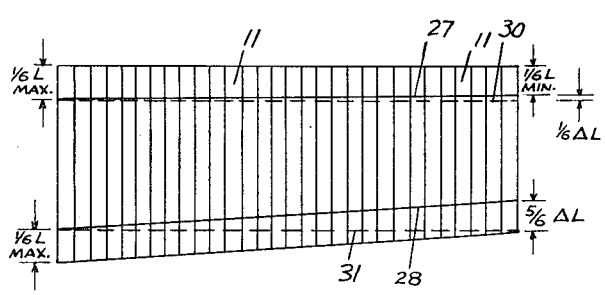
Fig. 4 is a diagram of the method of mounting the magnetostrictive elements.
Figure 2:
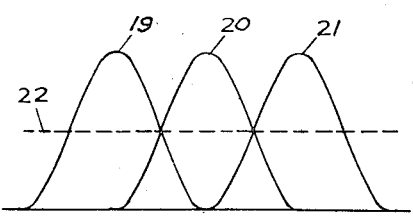
Fig. 2 is a diagram showing the resonant curves of adjacent magnetostrictive elements.

In Fig. 1, the reference numeral 10 designates generally the magnetostrictive filter assembly comprising a plurality of magnetostrictive rods 11 mounted about two discs 12 by means of bands 13 of elastic material that press the rods 11 against two spacers 14 of which only one is shown, formed with triangular teeth and each mounted on a disc 12. A fixed magnetic biassing field is applied to the rods 11 by means of a coil 15 connected to a source 16 of fixed potential. One or more permanent magnets can be mounted within the array of magnetostrictive elements 11 to give this fixed magnetic biassing field in place of the coil 15. The signal to be analysed is applied to all of the rods by means of a coil 17 connected to a source 18 of signals that are to be analysed as to frequency, such as a CW or FM radar. Each rod is of such a length and is so mounted that it resonates at the third harmonic of its fundamental resonant frequency. This harmonic is one of the exciting frequencies applied to the coil 17. The lengths of the rods 11 are selected so that the resonant curves 19, 20, and 21 of three adjacent rods overlap at their half power points, as indicated by the dotted line 22 in Fig. 2, to assure complete coverage of the band while separating the different component frequencies. The lengths of the rods are also selected so that they expand and contract in the manner shown in Fig. 3 by the graph 23 in which displacement is plotted vertically and the length of the rod horizontally. The variation of the pressure along the length of the rod while it is vibrating in this mode is shown in Fig. 3 by the graph 24. It will be seen that there are two anodes 25 and 26, each positioned one-sixth of the length of the rod from its respective end. The upper ends of the rods are arrayed about the arc of a circle in a common plane and are supported at a row of points located one-sixth of the length of the rods from the top along the solid line 27 in Fig. 4. They are also supported along a second row of points located one-sixth of the length of the rods from the bottom along the solid line 28. It will be seen that the upper line 27 varies from a line shown as the dotted line 30 parallel to the tops of the rods 11 by a maximum distance equal to one-sixth of the total difference in length, ΔL, of the rod resonant at the lowest frequency of interest and the rod resonant at the highest frequency of interest. The solid line 28 varies from a line shown in Fig. 4 as the dotted line 31 parallel to the bottoms of the rods 11 by a maximum distance equal to five-sixths of the greatest difference in length, ΔL, between the rods.

The compressional wave energy or sound waves created by the magnetostrictive displacement of the rods is picked up from each rod in turn by a sampling tube 32 and applied to a microphone 33, preferably of the condenser type, supported by a bracket 33a. The sampling tube 32 is mounted on a disc 34 attached to a shaft 35 driven by a motor 36 through pulleys 37 and 38 and a belt 40. A piece of magnetic material 41 is attached to a disc 42 fastened to the shaft 35 so that it passes under the arm 43 of a permanent magnet 44 once every revolution to generate a synchronizing pulse in a coil 45 wound about the magnet. This pulse is applied to the deflection circuit that produces the base for the display on the face of a cathode ray tube 46. The output of the microphone 33, after amplification in amplifier 47, passes through a band pass filter 48 to a detector 50. The output of the detector 50 is applied to the vertical deflection circuits of the cathode ray tube 46.

In operation, the various frequencies present in the signal being amplified will produce magnetostrictive displacements in each of the rods. Those frequencies falling within the resonant curve of individual rods 11 will produce greater displacements in those rods and greater compressional wave energy, or more intense sound, will come from those rods and be picked up by the sampling tube 32 when it passes over them and will drive the microphone 33. Stated another way, the output of the microphone will be greatest when the sampling tube is passing over one of the rods resonant at a frequency present in the signal being analyzed. This will cause a greater deflection of the cathode ray in the tube 46 at a point in its travel corresponding to the position of the rod resonant at the frequency indicated.

A second method for detecting the magnitude of the magnetostrictive displacement of the rods is shown in Fig. 5. The rods 51 are mounted in a manner similar to that shown in Figs. 1 and 4 for the rods 11. The rods are biased and excited with the signal in the same way as the rods 11 by a coil 49 connected to a signal source 59. The rods 51 are connected to a source 52 of potential. A disc 53 of the area of the cross section of a rod 51 is carried on a disc 54 that is attached to a shaft 55 that is rotated by a motor 56 through pulleys 57 and 58 and belt 60 so as to position the disc successively over the upper end of each rod 51 in turn. This disc 53 is returned to the source 52 through a capacitor formed by a conductive coating 61 on the disc 54 and a disc 62 of conductive material supported about it and a resistor 63.

As is well known, the capacity of a capacitor is indirectly proportional to the distance separating its plates. Thus, as the ends of the rods 51 are displaced by magnetostrictive action, the capacity of the capacitor formed by the disc 53 and the end of the rod 51 that is positioned below the disc will vary as the rod vibrates. The maximum extent of the displacement and the maximum capacity change will occur over the rods resonant at frequencies present in the applied signal. A varying voltage will be developed across the resistor 63 that indicates the magnetostrictive displacement of the rods 51. This voltage is applied after filtering in the filter 64, amplification in amplifier 65, and detection in detector 66 to the vertical deflection circuits of a cathode ray tube 68. Synchronizing pulses are generated by a generator 70 similar to that shown in Fig. 1 and applied to the circuits controlling the base line deflection of the cathode ray tube 68. The result is a display similar to that produced in the embodiment shown in Fig. 1. The capacitive voltage divider effect of the capacity connections of this embodiment are best seen in Fig. 6.

A modified circuit is shown in Fig. 7 where the source of potential 71 is connected across the small capacity formed by the end of the magnetostrictive rod 51 and a small disc 72 through a brush 73, commutator ring 74 mounted on the shaft 55, and a resistor 75. The variations in this voltage due to the magnetostrictive displacements of the ends of the rods 51 with respect to the disc 72 are coupled to the utilization circuit through a capacitor 76 that may be formed as a conductive coating on a rotating disc, such as coating 61 on the disc 54 in Fig. 5, and a fixed conductive disc, such as disc 62 in Fig. 5. The disc 72, the resistor 75 and the lower plate of the capacitor 76 are mounted on the shaft 55.

A third method for detecting the magnitude of the magnetostrictive displacement of the rods is shown in Figs. 8 and 9. The rods 80 are arranged as before about a cylindrical surface with their upper ends lying in a common plane. These rods are biased and supplied with the signal to be analysed in the same way as shown in Figs. 1 and 5. A source or sources of light, such as the circular neon tube 81 shown, is arranged about the outside of the upper ends of the rods 80. The edges 82 and 83 of two rings 84 and 85 form a narrow slit to cause the light from the source 81 to form a thin disc in the plane of the end faces of the rods 80. A mirror 86 is positioned on the axis of a shaft 87 to which it is attached. The shaft 87 is rotated by a motor in a manner similar to the way the motor 56 rotates the shaft 55 in Fig. 5. The mirror 86 reflects light coming from the light source 81 through a light type box 88 to a photoelectric device 90 positioned directly above the mirror. The amount of light reaching the photoelectric device is dependent upon the magnitude of the magnetostrictive displacement of the end of the rod 80 that is positioned between it and the light source 81. The resulting signal as in the other embodiments is amplified, filtered, and detected and then applied to the vertical deflection circuits of a cathode ray tube which has its base sweep circuits synchronized by a synchronizing generator similar to that shown in Figs. 1 and 5. The result is a display similar to that produced by the apparatus shown in Figs. 1 and 5.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a magnetostrictive frequency analyser, a plurality of rods of magnetostrictive material, each resonant at a discrete narrow band of frequencies, means to excite said rods with the signal to be frequency analysed, means to mount said rods with one end of each in a common plane, means to sense the amplitude of the axial magnetostrictive displacement in each rod successively and indicator means under control of the output of said sensing means.

2. In a magnetostrictive frequency analyser, a plurality of rods of magnetostrictive material, each resonant at a discrete narrow band of frequencies, means to excite said rods with the signal to be frequency analysed, means to mount said rods with one end of each in a common plane, acoustic means to sense the amplitude of the axial magnetostrictive displacement in each rod successively and indicator means under control of the output of said sensing means.

3. In a magnetostrictive frequency analyser, a plurality of rods of magnetostrictive material, each resonant at a discrete narrow band of frequencies, means to excite said rods with the signal to be frequency analysed, means to mount said rods with one end of each in a common plane, acoustic means to sense the amplitude of the axial magnetostrictive displacement in each rod successively comprising an acoustic transducer and means to couple said transducer to each rod successively and indicator means under control of the output of said sensing means.

4. In a magnetostrictive frequency analyser, a plurality of rods of magnetostrictive material, each resonant at a discrete narrow band of frequencies, means to excite said rods with the signal to be frequency analysed, means to mount said rods with one end of each in a common plane, capacitive means to sense the amplitude of the axial magnetostrictive displacement in each rod successively and indicator means under control of the output of said sensing means.

5. In a magnetostrictive frequency analyser, a plurality of rods of magnetostrictive material, each resonant at a discrete narrow band of frequencies, means to excite said rods with the signal to be frequency analysed, means to mount said rods with one end of each in a common plane, capacitive means to sense the amplitude of the axial magnetostrictive displacement in each rod successively comprising means to position said rods about the arc of a circle with one end of each in a common plane, a disc having an area approximately that of the cross-sectional area of a rod, a source of potential, means to connect said disc and the rods in series across said source of potential and means to align said disc parallel to and directly over each rod successively to form a capacitor and indicator means under control of the output of said sensing means.

6. In a magnetostrictive frequency analyser, a plurality of rods of magnetostrictive material, each resonant at a discrete narrow band of frequencies, means to excite said rods with the signal to be frequency analysed, means to mount said rods with one end of each in a common plane, photoelectric means to sense the amplitude of the axial magnetostrictive displacement in each rod successively and indicator means under control of the output of said sensing means.

7. In a magnetostrictive frequency analyser, a plurality of rods of magnetostrictive material, each resonant at a discrete narrow band of frequencies, means to excite said rods with the signal to be frequency analysed, means to mount said rods with one end of each in a common plane, photoelectric means to sense the amplitude of the axial magnetostrictive displacement in each rod successively comprising a light source, means to form the light from said source in a beam of small cross section across the end of each rod successively, and photoelectric transducer means positioned on the opposite side of the rods from the light source and indicator means under control of the output of said sensing means.

8. In a magnetostrictive frequency analyser, a plurality of rods of magnetostrictive material, each resonant at a discrete narrow band of frequencies, means to support each said rod at two points each displaced from the end by a distance substantially equal to one-sixth of the wavelength of the third harmonic of the resonant frequency of the rod and with an end of each in a common plane, means to excite said rods with the signal to be frequency analysed, means to sense the amplitude of the axial magnetostrictive displacement in each rod successively and indicator means under control of the output of said sensing means.

9. In a magnetostrictive frequency analyser, a plurality of rods of magnetostrictive material, each resonant at a discrete narrow band of frequencies, means to support each said rod at two points each displaced from the end by a distance substantially equal to one-sixth of the wavelength of the third harmonic of the resonant frequency of the rod and with an end of each in a common plane, means to excite said rods with the signal to be frequency analysed, acoustic means to sense the amplitude of the axial magnetostrictive displacement in each rod successively and indicator means under control of the output of said sensing means.

10. In a magnetostrictive frequency analyser, a plurality of rods of magnetostrictive material, each resonant at a discrete narrow band of frequencies, means to support each said rod at two points each displaced from the end by a distance substantially equal to one-sixth of the wavelength at the third harmonic of the resonant frequency of the rod and with an end of each in a common plane, means to excite said rods with the signal to be frequency analysed, acoustic means to sense the amplitude of the axial magnetostrictive displacement in each rod successively comprising an acoustic transducer and means to couple said transducer to each rod successively and indicator means under control of the output of said sensing means.

11. In a magnetostrictive frequency analyser, a plurality of rods of magnetostrictive material, each resonant at a discrete narrow band of frequencies, means to support each said rod at two points each displaced from the end by a distance substantially equal to one-sixth of the wavelength of the third harmonic of the resonant frequency of the rod and with an end of each in a common plane, means to excite said rods with the signal to be frequency analysed, capacitive means to sense the amplitude of the axial magnetostrictive displacement in each rod successively and indicator means under control of the output of said sensing means.

12. In a magnetostrictive frequency analyser, a plurality of rods of magnetostrictive material, each resonant at a discrete narrow band of frequencies, means to support each said rod at two points each displaced from the end by a distance substantially equal to one-sixth of the wavelength of the third harmonic of the resonant frequency of the rod, means to excite said rods with the signal to be frequency analysed, capacitive means to sense the amplitude of the axial magnetostrictive displacement in each rod successively comprising means to position said rods about the arc of a circle with one end of each in a common plane, a disc having an area approximately that of the cross-sectional area of a rod, a source of potential, means to connect said disc and the rods in series across said source of potential and means to align said disc parallel to and directly over each rod successively to form a capacitor and indicator means under control of the output of said sensing means.

13. In a magnetostrictive frequency analyser, a plurality of rods of magnetostrictive material, each resonant at a discrete narrow band of frequencies, means to support each said rod at two points each displaced from the end by a distance substantially equal to one-sixth of the wavelength of the third harmonic of the resonant frequency of the rod and with an end of each in a common plane, means to excite said rods with the signal to be frequency analysed, photoelectric means to sense the amplitude of the axial magnetostrictive displacement in each rod successively and indicator means under control of the output of said sensing means.

14. In a magnetostrictive frequency analyser, a plurality of rods of magnetostrictive material, each resonant at a discrete narrow band of frequencies, means to support each said rod at two points each displaced from the end by a distance substantially equal to one-sixth of the wavelength of the third harmonic of the resonant frequency of the rod and with an end of each in a common plane, means to excite said rods with the signal to be frequency analysed, photoelectric means to sense the amplitude of the axial magnetostrictive displacement in each rod successively comprising a light source, means to form this light from said source in a beam of small cross section across the end of each rod successively, and photoelectric transducer means positioned on the opposite side of the rods from the light source and indicator means under control of the output of said sensing means.

15. In a magnetostrictive frequency analyser, a plurality of rods of magnetostrictive material, each resonant at a discrete narrow band of frequencies, means to excite said rods with the signal to be frequency analysed, means to mount said rods with one end of each in a common plane, a transducer, means to position said transducer to sense the amplitude of the axial magnetostrictive displacement in each rod successively, indicator means with two components of deflection, means under control of the transducer positioning means for controlling one component of the deflection of the indicator, and means under control of the output of the transducer for controlling the other component of the deflection of the indicator.

16. In a magnetostrictive frequency analyser, a plurality of rods of magnetostrictive material, each resonant at a discrete narrow band of frequencies, means to excite said rods with the signal to be frequency analysed, means to mount said rods with one end of each in a common plane, an acoustic transducer, means to position said transducer to sense the amplitude of the axial magnetostrictive displacement in each rod successively, indicator means with two components of deflection, means under control of the transducer positioning means for controlling one component of the deflection of the indicator, and means under control of the output of the transducer for controlling the other component of the deflection of the indicator.

17. In a magnetostrictive frequency analyser, a plurality of rods of magnetostrictive material, each resonant at a discrete narrow band of frequencies, means to excite said rods with the signal to be frequency analysed, means to mount said rods with one end of each in a common plane, capacitive means to sense the amplitude of the axial magnetostrictive displacement of a rod, means to position said capacitive means to sense the displacement of each rod successively, indicator means with two components of deflection, means under control of the capacitor positioning means for controlling one component of the deflection of the indicator and means under control of the output of the sensing means for controlling the other component of the deflection of the indicator.

18. In a magnetostrictive frequency analyser, a plurality of rods of magnetostrictive material, each resonant at a discrete narrow band of frequencies, means to excite said rods with the signal to be frequency analysed, means to mount said rods with one end of each in a common plane, photoelectric transducer means to sense the amplitude of the axial magnetostrictive displacement of the rods, means to position said photoelectric means to sense the displacement of each rod successively, indicator means with two components of deflection, means under control of the photoelectric transducer positioning means for controlling one component of the deflection of the indicator, and means under control of the output of the transducer for controlling the other component of the deflection of the indicator.

References Cited in the file of this patent

UNITED STATES PATENTS

| | | |
|---|---|---|
| 1,882,399 | Pierce | Oct. 11, 1932 |
| 2,602,836 | Foster | July 8, 1952 |
| 2,648,822 | Walter | Aug. 11, 1953 |